United States Patent
Guo et al.

(10) Patent No.: US 12,333,704 B2
(45) Date of Patent: Jun. 17, 2025

(54) METHODS AND DEVICES FOR DETECTING SURFACE DEFECTS BASED ON PERCEPTUAL AUTOENCODERS

(71) Applicant: XI'AN MICROELECTRONICS TECHNOLOGY INSTITUTE, Shanaxi (CN)

(72) Inventors: Shuaibing Guo, Xi'an (CN); Yulong Hu, Xi'an (CN); Bo Chai, Xi'an (CN)

(73) Assignee: XI'AN MICROELECTRONICS TECHNOLOGY INSTITUTE, Xi'an (CN)

( * ) Notice: Subject to any disclaimer, the term of this patent is extended or adjusted under 35 U.S.C. 154(b) by 0 days.

(21) Appl. No.: 19/031,417

(22) Filed: Jan. 18, 2025

(65) Prior Publication Data
US 2025/0166160 A1 May 22, 2025

Related U.S. Application Data

(63) Continuation-in-part of application No. PCT/CN2024/101738, filed on Jun. 26, 2024.

(30) Foreign Application Priority Data

Jun. 27, 2023 (CN) .......................... 202310770586.9

(51) Int. Cl.
G06T 7/00 (2017.01)

(52) U.S. Cl.
CPC .. G06T 7/0006 (2013.01); *G06T 2207/20081* (2013.01); *G06T 2207/20084* (2013.01); *G06T 2207/30148* (2013.01)

(58) Field of Classification Search
CPC ......... G06T 7/0006; G06T 2207/20081; G06T 2207/20084; G06T 2207/30148
See application file for complete search history.

(56) References Cited

U.S. PATENT DOCUMENTS

2021/0209418 A1* 7/2021 Badanes .............. G06V 10/809
2023/0394651 A1* 12/2023 Li ........................ G06N 3/0475
(Continued)

FOREIGN PATENT DOCUMENTS

CN 113077453 A 7/2021
CN 116309562 A 6/2023
(Continued)

OTHER PUBLICATIONS

International Search Report in PCT/CN2024/101738 mailed on Sep. 10, 2024, 6 pages.
(Continued)

*Primary Examiner* — Ping Y Hsieh
(74) *Attorney, Agent, or Firm* — PORUS IP LLC (57) ABSTRACT

A method for detecting a surface defect based on a perceptual autoencoder is provided, which belongs to the field of integrated circuit defect detection. By using perceptual loss instead of pixel-by-pixel loss, the problem of blurred single-pixel-loss output image with serious distortion at the edges is solved. This manner is highly migratory, and it may migrate well to the new target to be detected. On the other hand, by using the feature pyramid instead of the sliding window manner, the feature pyramid does not require a plurality of redundant computation by sliding on the original image, which effectively reduces the memory and computation cost. A system for detecting a surface defect based on a perceptual autoencoder is also provided, which includes specific modules for implementing the above method. In addition, a computer device and a storage medium of the above method are provided, for accomplishing operations of the above method.

8 Claims, 7 Drawing Sheets

(56) References Cited

U.S. PATENT DOCUMENTS

2024/0046453 A1\* 2/2024 Jacob ................... G16H 50/20
2024/0257309 A1\* 8/2024 Holland .................. G06T 7/30

FOREIGN PATENT DOCUMENTS

| CN | 116823768 A | 9/2023 |
| --- | --- | --- |
| WO | 2008068894 A1 | 6/2008 |

OTHER PUBLICATIONS

Written Opinion in PCT/CN2024/101738 mailed on Sep. 10, 2024, 6 pages.

\* cited by examiner

METHODS AND DEVICES FOR DETECTING SURFACE DEFECTS BASED ON PERCEPTUAL AUTOENCODERS

CROSS-REFERENCE TO RELATED APPLICATIONS

This application is a Continuation-in-part of International Application No. PCT/CN2024/101738, filed on Jun. 26, 2024, which claims priority to Chinese Patent Application No. 202310770586.9, filed on Jun. 27, 2023, the entire contents of each of which are hereby incorporated by reference.

TECHNICAL FIELD

The present disclosure relates to the field of defect detection of integrated circuits, and in particular, to methods and devices for detecting surface defects based on perceptual autoencoders.

BACKGROUND

In the field of automated defect detection technology for circuits, machine vision methods are generally used for defect detection. Based on different ways of feature extraction, defect detection methods may be categorized into traditional appearance detection methods and intelligent detection methods. Existing traditional appearance detection methods mainly rely on the specificity of optical design for detection, typical methods are structured light defect detection, design light source reflection surface marking detection, etc. These typical methods are poorly migrated, and requires independent design for different products. Existing smart detection methods may be categorized into two groups based on whether supervision is required. Methods that require supervision are more accurate but require a large amount of product data with labeling, which cannot be adapted to industrial detection scenarios. Unsupervised methods do not need to be independently designed and manually labeled and may be adapted to surface defect detection of circuit application scenarios.

In order to enhance the relocatability of the detection of different products, an autoencoder (AE) is used in defect detection. AE is an unsupervised technique, based on the back propagation algorithm with optimization methods, which uses the input data as supervision to guide the neural network to learn mapping relations. As a new feature extraction method, AE may complete product image feature extraction and image generation under unsupervised conditions. Thus, the feature extraction capability of AE may be utilized to extract features of defect-free products, generate templates and compare them to quickly migrate to surface detection scenarios of different circuits, greatly enhancing the versatility of the surface detection method.

AE applied in the rest of the field commonly uses pixel-by-pixel loss as a loss function, such as mean square error (MSE). The pixel-by-pixel loss involves information about a single pixel and ignores structural information across pixels, which is detrimental to the surface detection of the circuit. In this process, due to the nature of the pixel-by-pixel loss, the network tends to output the image after blurring, leading to severe distortion of the edges and being bad for the detection of products like circuits, which have more edges. At the same time, the pixel-by-pixel loss treats each pixel equally, whereas in the detection scenario of circuits, pixels representing defects are far more important than defect-free pixels, which leads to the difficulty of adapting the pixel-by-pixel loss to application scenarios of surface defect detection in circuits. If AE uses perceptual loss, the loss of edge information is reduced, which in turn increases the similarity of the synthesized templates and increases the accuracy of the detection.

SUMMARY

The purpose of the present disclosure is to overcome the drawbacks of the above-mentioned prior art, and to provide a method for detecting a surface defect based on a perceptual autoencoder and related devices.

To achieve the above purpose, the present disclosure is realized by using the following technical solution.

One of the embodiments of the present disclosure provides a method for detecting a surface defect based on a perceptual autoencoder. The method may include operation (1): constructing an unsupervised perceptual autoencoder network with an encoder-decoder architecture, wherein the encoder includes a feature pyramid; and inputting a defect-free sample image to the encoder, wherein the encoder extracts features at different scales from the sample image and then performs a convolution on the features to obtain a feature map, and the decoder outputs an initial reconstructed image by performing an inverse convolution on the feature map; operation (2): inputting the initial reconstructed image and an original image into a perceptual computing network, wherein the perceptual computing network determines a feature map of the initial reconstructed image and a feature map of the original image, determining a perceptual loss based on the feature map of the initial reconstructed image and the feature map of the original image, optimizing the perceptual autoencoder network based on the perceptual loss using a backpropagation algorithm, and completing training of the perceptual autoencoder network until the perceptual loss reaches a minimum value; operation (3): acquiring an image to be detected of a circuit to be detected, inputting the image to be detected into a trained perceptual autoencoder network, and outputting a defect-free output image as a template image; and performing a recursive quadratic segmentation on the template image and the image to be detected using a quadtree algorithm and stopping the recursive quadratic segmentation until an area of a segmented region that is lower than a preset similarity threshold is less than or equal to a preset minimum precision, wherein: in response to determining that a structural similarity of a region is less than or equal to the preset similarity threshold, the region is output as a defective region; or in response to determining that the structural similarity of the region is greater than the preset similarity threshold, there is no output, indicating no defect.

One of the embodiments of the present disclosure provides a for detecting a surface defect based on a perceptual autoencoder, comprising a building module, a training module, and a detection module. The construction module is configured to construct an unsupervised perceptual autoencoder network with an encoder-decoder architecture, wherein the encoder includes a feature pyramid; and input a defect-free sample image to the encoder, wherein the encoder extracts features at different scales from the sample image and then performs a convolution on the features to obtain a feature map, and the decoder outputs an initial reconstructed image by performing an inverse convolution on the feature map. The training module is configured to input the initial reconstructed image and an original image into a perceptual computing network, wherein the perceptual computing network determines a feature map of the initial reconstructed image and a feature map of the original image, determine a perceptual loss based on the feature map of the initial reconstructed image and the feature map of the original image, optimize the perceptual autoencoder network based on the perceptual loss using a backpropagation algorithm, and complete training of the perceptual autoencoder network until the perceptual loss reaches a minimum value. The detection module is configured to acquire an image to be detected of a circuit to be detected, input the image to be detected into a trained perceptual autoencoder network, and output a defect-free output image as a template image; and perform a recursive quadratic segmentation on the template image and the image to be detected using a quadtree algorithm and stop the recursive quadratic segmentation until an area of a segmented region that is lower than a preset similarity threshold is less than or equal to a preset minimum precision, wherein: in response to determining that a structural similarity of a region is less than or equal to the preset similarity threshold, the region is output as a defective region; or in response to determining that the structural similarity of the region is greater than the preset similarity threshold, there is no output, indicating no defect.

One of the embodiments of the present disclosure provides a computer device comprising a memory, a processor, and a computer program stored in the memory and runnable on the processor, wherein the processor executing the computer program to implement the method for detecting a surface defect based on a perceptual autoencoder.

One of the embodiments of the present disclosure provides a non-transitory computer-readable storage medium storing computer instructions. When a computer program reads the computer instructions in the storage medium, the computer performs the method described herein.

DETAILED DESCRIPTION

The present disclosure is described in further detail below in conjunction with the accompanying drawings.

Embodiment 1

The specific scenario to which the present disclosure is directed is as follows. In the process of processing and manufacturing of circuits, a control unit detects surface defects in the manufactured circuits, and instructions related to the detection and the results of the detection, etc., may be stored in a storage medium.

The control unit may process data and/or information obtained from other devices or system components. The control unit may execute program instructions based on such data, information, and/or processing results to perform one or more of the functions described in the present disclosure. In some embodiments, the control unit may include one or more sub-processing devices (e.g., a single-core processing device or a multi-core processing device). In some embodiments, a portion or all of the components of a system for detecting a surface defect based on a perceptual autoencoder and/or a device for detecting a surface defect based on a perceptual autoencoder may be integrated into the control unit. More detailed descriptions regarding the system for detecting the surface defect based on the perceptual autoencoder, and the device for detecting the surface defect based on the perceptual autoencoder may be found in FIG. 7 and its related descriptions.

The storage medium is configured to store data, instructions, and/or any other information. The storage medium may include one or more storage components, each of which may be a stand-alone device or part of other devices. In some embodiments, the storage medium may include random access memory (RAM), read-only memory (ROM), removable memory, etc., or any combination thereof. In some embodiments, there may be at least one storage media.

Figure 1:
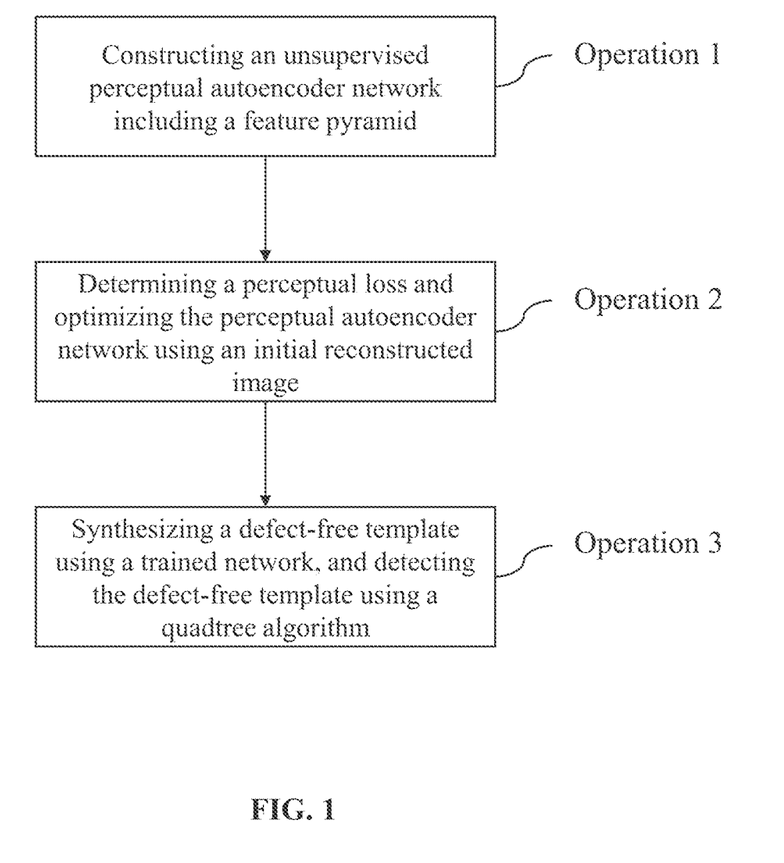
FIG. 1 is a flowchart illustrating an exemplary method for detecting a surface defect based on a perceptual autoencoder according to some embodiments of the present disclosure.

As shown in FIG. 1, the present disclosure provides a method for detecting a surface defect based on a perceptual autoencoder, including the following operations.

In operation 1: an unsupervised perceptual autoencoder network including a feature pyramid is constructed.

In some embodiments, constructing an unsupervised perceptual autoencoder network refers to constructing an unsupervised perceptual autoencoder network with an encoder-decoder architecture. In some embodiments, the perceptual autoencoder network may also be referred to simply as a perceptual autoencoder.

Figure 2:
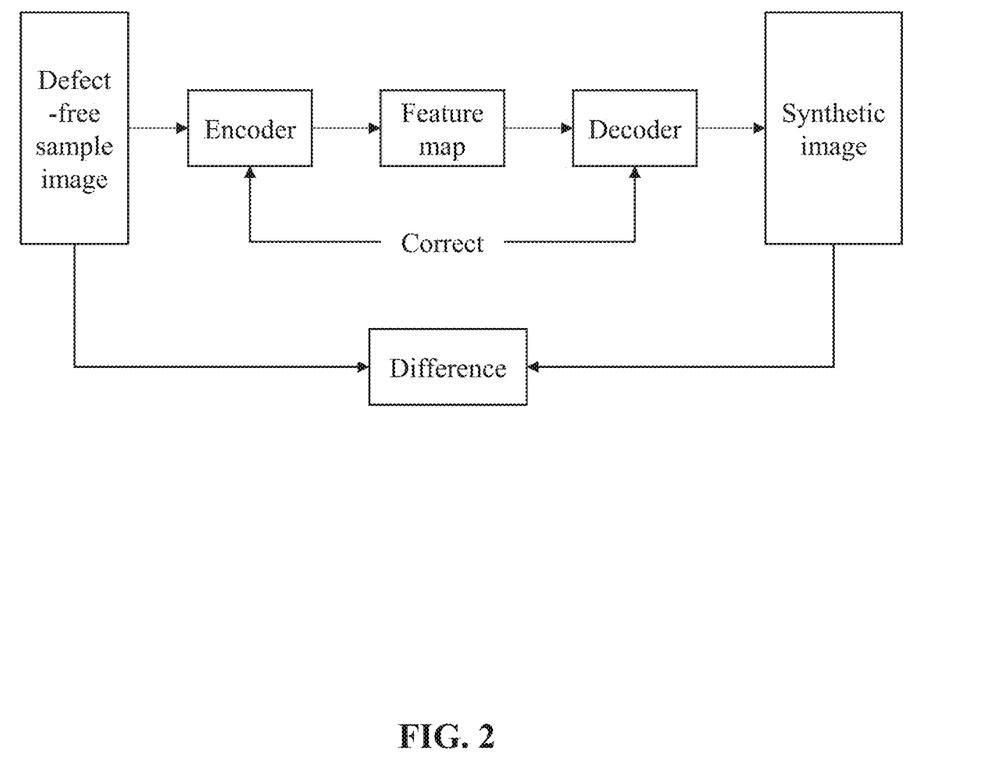
FIG. 2 is a schematic diagram illustrating a perceptual autoencoder network according to some embodiments of the present disclosure.

Referring to FIG. 2 for the basic architecture of the unsupervised perceptual autoencoder network as an encoder-decoder. The encoder obtains a feature map by performing a convolution on a preprocessed image. The decoder obtains a reconstructed image by performing an inverse convolution on the feature map.

Preprocessing refers to a data processing operation that is performed before the image data is input to the encoder. For example, the preprocessing may include resizing, normalization, color space conversion, etc. Resizing refers to an operation of resizing an image to match a fixed size input into the encoder. Normalization refers to an operation of scaling a pixel value of an image to a certain range (e.g., 0-1, etc.). Color space conversion refers to an operation of converting the image from one color space to another, e.g., from RGB to grayscale, etc.

In some embodiments, the encoder includes a feature pyramid, and the network may output feature maps of different depths separately to form the feature pyramid and simultaneously performs the inverse convolution on the feature maps of different depths to obtain a plurality of output images. The purpose of operation 1 is to build an unsupervised perceptual autoencoder network to obtain an initial reconstructed image. In some embodiments, the initial reconstructed image may also be referred to as a synthetic image characterizing the initial reconstructed image as an image obtained from the inverse convolution based on the feature maps of different depths.

The feature pyramid refers to a hierarchical feature representation formed by extracting feature mapping from different layers of the perceptual autoencoder network and processing these features. Each layer of features represents a different spatial resolution and a different depth of semantic information. The spatial resolution refers to a spatial dimension of the feature map, i.e., its width and height. The semantic information refers to the level of abstraction of the information contained in the feature map.

The initial reconstructed image refers to an image that is generated or restored based on the feature map through the perceptual autoencoder network.

In some embodiments, the control unit may input a defect-free sample image to the encoder. The encoder extracts features at different scales from the input image, and performs the convolution to obtain the feature map, then the decoder outputs the initial reconstructed image by performing the inverse convolution on the feature map.

The defect-free sample image refers to a sample image that is free of any areas or features that may be recognized as a defect. The defect refers to any feature or blemish in the sample image that does not conform to a standard or expectation, for example, solder joints that are too large, broken wires on a circuit board, or the like.

In some embodiments, the sample image is a grayscale image or a color image of a circuit.

In some embodiments of the present disclosure, the use of the grayscale image as the sample image reduces the amount of computation, and at the same time facilitates segmentation and edge detection. The use of the color image as the sample image provides rich details and features about the color and improves the discrimination of objects and backgrounds and facilitates extraction of a portion of image features.

The features at different scales refer to features that reflect different sizes, resolutions, or levels of detail in the images. That is, different scales may be understood as differences in feature attributes, which include image size, resolution, semantic information, etc. Through multi-level convolutional operations, the network may extract feature maps, which have different spatial resolutions and levels of detail. A feature map at a lower level typically has a higher spatial resolution and retains more local detail but less semantic information. A feature map at a higher level has a reduced spatial resolution while reinforcing semantic information to better capture global features.

In some embodiments of the present disclosure, the feature pyramid is used instead of a sliding window manner, which does not require a plurality of redundant calculations by the sliding window manner and saves computational costs. In addition, there is no need to annotate the input image, saving a lot of manpower.

In operation 2, a perceptual loss is determined and the perceptual autoencoder network is optimized using the initial reconstructed image.

Figure 3:
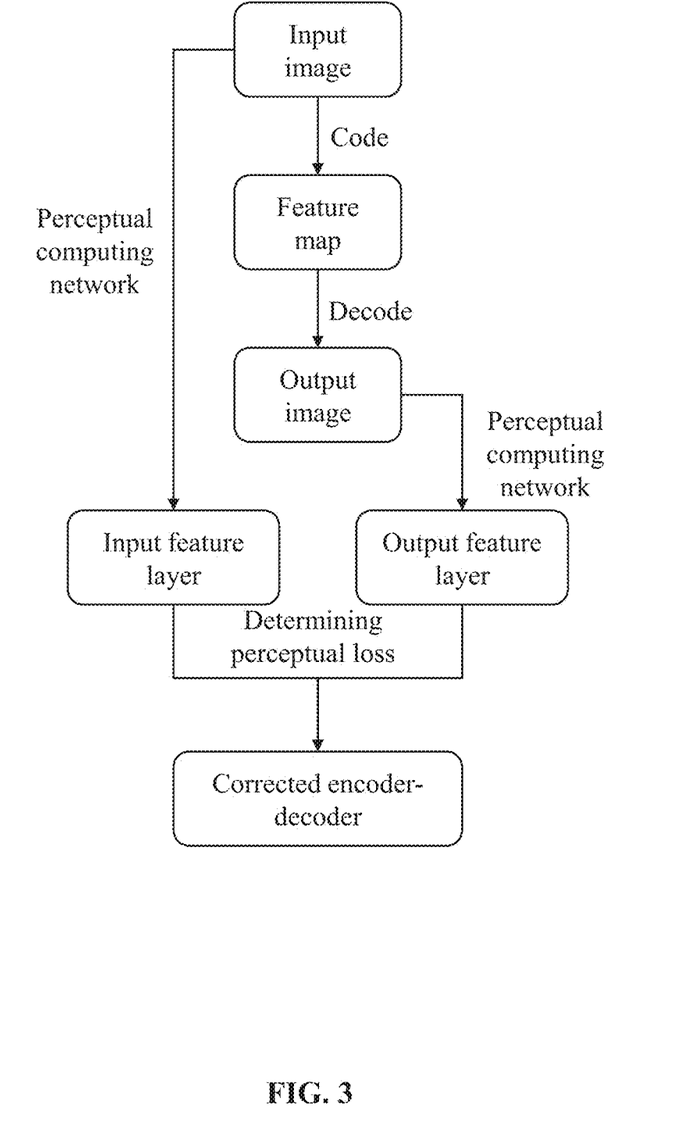
FIG. 3 is a schematic diagram illustrating a training process of a perceptual autoencoder network according to some embodiments of the present disclosure.

Referring to FIG. 2 and FIG. 3, the control unit may determine the perceptual loss using the initial reconstructed image obtained in operation 1. In some embodiments, the control unit may input the initial reconstructed image and the input image into a pre-trained perceptual computing network. The perceptual computing network determines the perceptual losses of the initial reconstructed image and the input image and optimizes, using an optimization algorithm, the perceptual autoencoder network until the perceptual losses reach a minimum value.

In some embodiments, the control unit may input the initial reconstructed image and an original image (i.e., the input image) into the perceptual computing network. The perceptual computing network determines feature maps of the initial reconstructed image and the original image, respectively. The control unit may then determine the perceptual loss based on the feature maps of the two, optimize the perceptual autoencoder network based on the perceptual losses using a backpropagation algorithm, and complete the training of the perceptual autoencoder network until the perceptual loss reaches a minimum value.

The input image refers to an image that is input to the perceptual autoencoder network to obtain the initial reconstructed image.

The perceptual computing network refers to a network architecture based on a perceptual computing concept, which relies on technologies such as deep learning, machine learning, computer vision, natural language processing, and other techniques for efficient data processing and pattern recognition. The perceptual computing concept refers to a concept that enhances the naturalness and intelligence of a computer system when interacting with a human being by understanding and simulating the human perceptual system.

The perceptual loss refers to a loss function used to measure the quality of image synthesis or reconstruction.

The optimization algorithm refers to a technique and manner for adjusting parameters of the perceptual computing network to minimize or maximize the perceptual loss. The optimization algorithms may, for example, include a gradient descent algorithm, a back propagation algorithm, or the like.

In some embodiments, the control unit may first acquire a grayscale image of a surface of a defect-free circuit and notes the grayscale image as an original image. The original image is then input into a perceptual autoencoder network to output an initial reconstructed image. The original image and the initial reconstructed image are input into the perceptual computing network to obtain the perceptual loss.

In some embodiments, the perceptual loss is a mean square error between the initial reconstructed image feature map and the original image feature map. The process of obtaining the perceptual loss includes inputting the original image and the initial reconstructed image into a pre-trained perceptual computing network, the perceptual computing network determining the feature images of the original image and the initial reconstructed image and determining the mean square error on the feature images of the two to obtain the perceptual loss.

In some embodiments, in an initial reconstructed image OUTPUT output by a perceptual autoencoder network with a size of W×H×N, the initial reconstructed image OUTPUT corresponds one-to-one to an original image INPUT at pixel levels, e.g., both the original image and the initial reconstructed image are in a size of 512×512×1.

The control unit determine the feature maps of the original image and the initial reconstructed image separately by convolution using the perceptual computing network. Each pixel point in the feature map of the original image corresponds to a plurality of pixel points of the original image, the plurality of pixel points are referred to as a receptive field. The same applies to the initial reconstructed image.

The size of the receptive field is determined by an equation $R_{m-1} = [(R_{m-1}) \times Str_m] + K_m$, where $R_{m-1}$ and $R_m$ denote the receptive field of the mth feature map which is deeper and the receptive field of the (m-1)th feature map which is shallower, respectively, $Str_m$ denotes a convolutional step size, and $K_m$ denotes a convolutional kernel size.

The control unit may iteratively determine the size of the receptive field by the above equation.

In some embodiments, the perceptual autoencoder network may adopt an ALEX network architecture, with a receptive field size of 195 at the final layer of the ALEX network.

The ALEX network refers to a deep convolutional neural network architecture. The final layer refers to the last layer of the ALEX network, also referred to as the output layer. The receptive field of the final layer tends to encompass the entire input image, which means that each neuron in the output layer can integrate the information from the entire input image for discrimination or classification.

In some embodiments, the expression for the function of perceptual loss is:

$$\text{Loss}_{per} = \Sigma_{k=1}^{n} f(\rho(X_k), \rho(\alpha(X)_k)).$$

In the above equation, $\text{Loss}_{per}$ denotes the perceptual loss, p denotes the perceptual computing network, X denotes the input image containing n components after vectorization, such as X is an input vector with size n; $X_k$ denotes the kth component of X, $\alpha(X)$ denotes a reconstructed template output by the perceptual autoencoder network, i.e., the initial reconstructed image; $\alpha(X)_k$ denotes the kth component after vectorization of the reconstruction template; $\rho(X_k)$ and $\rho(\alpha(X)_k)$ denote the kth feature vector of the input image extracted using a perceptual autoencoder network and the kth feature vector of the reconstructed template output by the perceptual autoencoder network, and a denotes an autoencoder operation, where X may also be represented based on a matrix form.

In some embodiments, after obtaining the perceptual loss, the control unit may optimize the perceptual autoencoder network using the perceptual loss with the backpropagation algorithm so that the perceptual autoencoder network obtains the features of the circuit and may use the obtained features of the circuit for detection.

The backpropagation algorithm refers to an important algorithm for training an artificial neural network such as the perceptual autoencoder network and is used to determine a gradient of each weight parameter in the neural network to update the weight by the optimization algorithm such as the gradient descent algorithm, thereby minimizing the loss function.

In some embodiments of the present disclosure, determining the perceptual loss by means of the above function expression may make the acquired perceptual loss more accurate, and improve the efficiency of subsequent optimization based on the perceptual loss.

In some embodiments, color images may be synthesized using perceptual loss as well, but more training samples are needed to extract features, and in this embodiment, training is performed using grayscale images, with 63 training samples.

In some embodiments of the present disclosure, structural features are retained due to the large receptive field of the feature map, which allows for a more accurate mean square error (i.e., the perceptual loss) of the feature map.

In operation 3, a defect-free template is synthesized using a trained network, and the defect-free template is detected using a quadtree algorithm.

Figure 4:
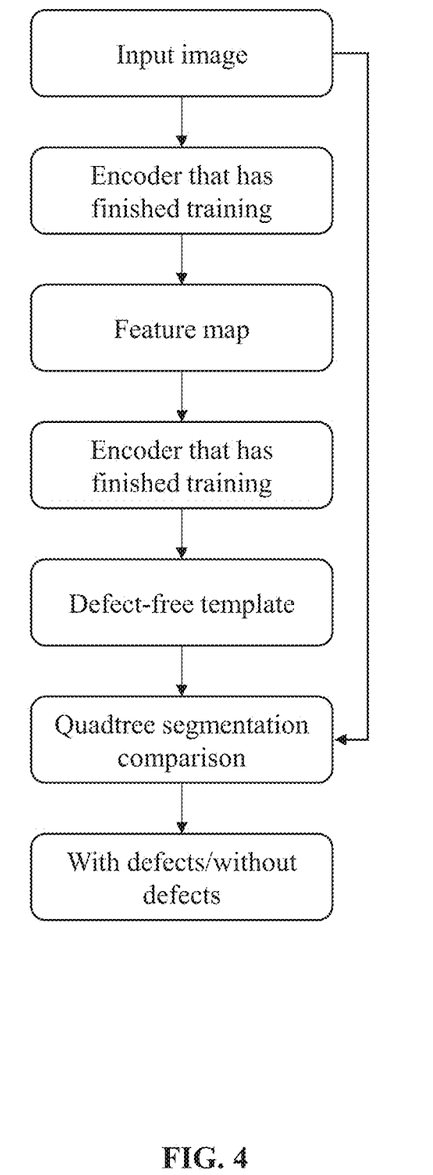
FIG. 4 is a schematic diagram illustrating an exemplary detection process of a perceptual autoencoder network according to some embodiments of the present disclosure.

In some embodiments, referring to FIG. 4, after the training is completed in operation 2, the control unit may acquire the grayscale image of the circuit to be detected, which is defined as an image to be detected (i.e., the input image). The image to be detected is input into the trained perceptual autoencoder network (i.e., the encoder that completes the training) to obtain a defect-free output image, which is defined as a template image (i.e., the defect-free template). For the input image, the encoder that completes the training outputs feature maps of different depths, respectively, to form a feature pyramid, and then the encoder that completes the training simultaneously performs the inverse convolution on the feature maps of different depths to obtain a plurality of output images, i.e., to obtain the defect-free template. The control unit then performs a quadtree segmentation comparison, i.e., utilizes a quadtree algorithm to perform recursive quadratic segmentation on the template image and the image to be detected until a structural similarity of a segmented region is lower than a preset similarity threshold, or an area of the segmented region is less than a preset minimum precision, to determine whether the image to be detected is defective.

In some embodiments, the control unit may acquire the image to be detected of the circuit to be detected, input the image to be detected into the trained perceptual autoencoder network, and output the defect-free output image as the template image. Then, the recursive quadratic segmentation is performed on the template image and the image to be detected using the quadtree algorithm. The recursive quadratic segmentation is stopped until the area of the segmented region that is lower than the preset similarity threshold is less than or equal to the preset minimum precision. At this time, if the structural similarity of the region is less than or equal to the preset similarity threshold, the region is output as a defective region; if the structural similarity of the region is greater than the preset similarity threshold, there is no output, indicating no defect.

For example, in the image to be detected, a region in which the structural similarity between the image and the template image is less than or equal to the preset similarity threshold is output as the defective region. If the structural similarity of all the regions in the image to be detected with the template image is greater than the preset similarity threshold, it indicates that there is no defect in the image to be detected.

The defect-free output image refers to an output image that does not have any areas or features that may be recognized as defects. The template image refers to an output image that serves as a template, i.e., the defect-free output image.

The quadtree algorithm refers to an algorithm for storing and managing data in an image. The principle of the quadtree algorithm is to recursively divide the space into four quadrants or regions until a specific condition is met. The specific condition may be that the structural similarity of the segmented region is lower than a preset similarity threshold, or that the area of the segmented region is smaller than a preset minimum precision.

The segmented region refers to an image region obtained after quadtree segmentation.

The structural similarity refers to data that characterizes the degree of similarity between the template image and the corresponding segmented region in the image to be detected. The structural similarity may be determined by the structural similarity index (SSIM) algorithm.

The preset similarity threshold and the preset minimum precision are critical values of the pre-set structural similarity and the area of the segmented region, respectively. The preset similarity threshold and the preset minimum precision may be preset by a staff based on experience or set by default by the system.

In some embodiments, the control unit inputs an image to be detected of a size of W×H×N, and the perceptual autoencoder network outputs a template image of a size of W×H×N. The image to be detected and the template image in this embodiment are of variable size, but both are single channel, i.e., W×H×1.

Figure 5:
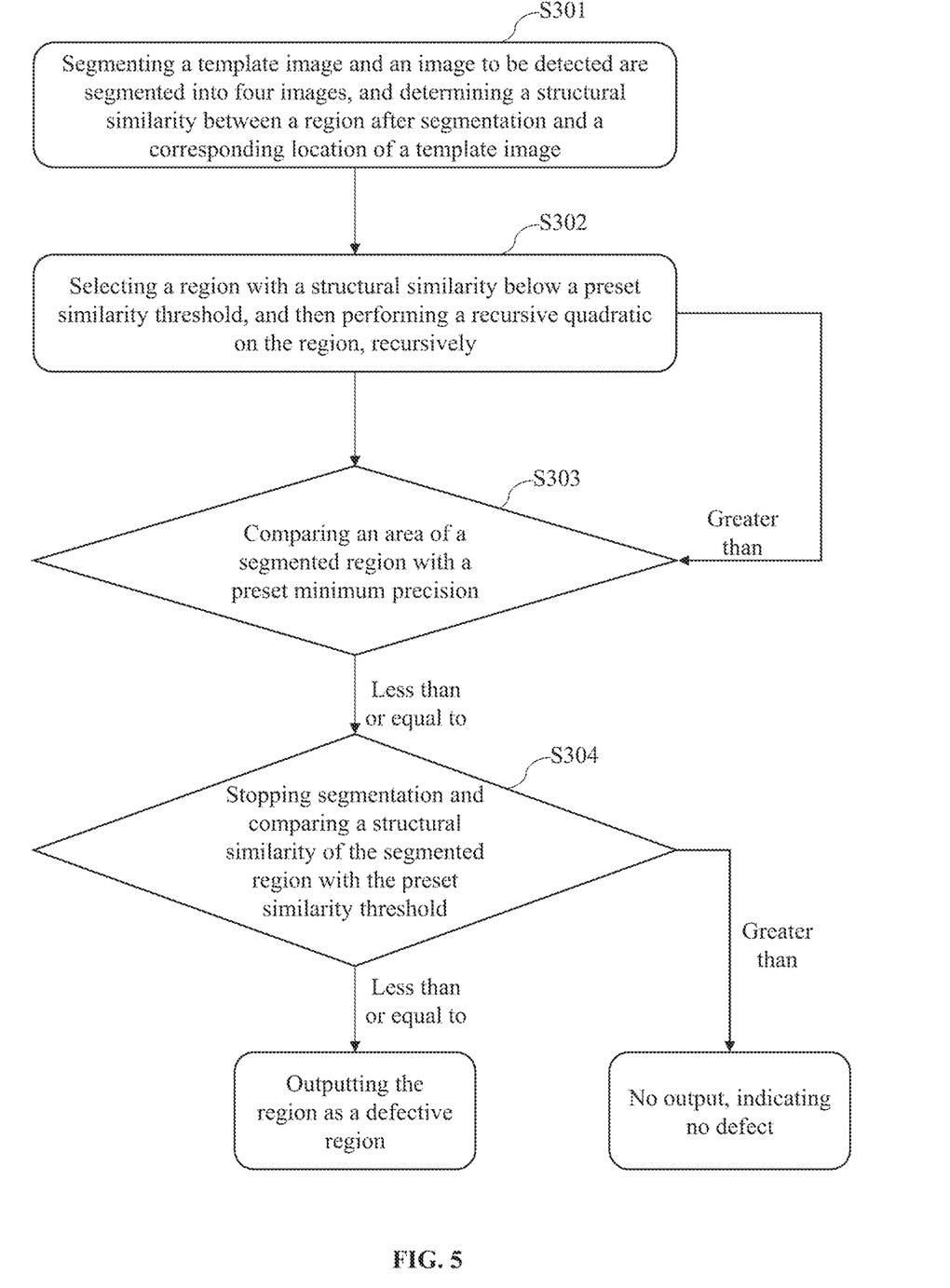
FIG. 5 is a schematic diagram illustrating an exemplary detection process of a quadtree algorithm according to some embodiments of the present disclosure.

Merely by way of example, the control unit inputs an image to be detected of a size of W×H×1 into a quadtree segmentation module, and segments, using the quadtree algorithm, the image to be detected into four images of a size of $$\frac{W}{2} \times \frac{H}{2} \times 1,$$

which are defined as regions A, B, C, and D. Structural similarities of positions of regions A, B, C, and D with the corresponding positions of the template image are determined, respectively. If the structural similarity is greater than a preset similarity threshold, such as the preset similarity threshold in this embodiment is 0.2, the quadtree segmentation is recursively and continuously performed on the segmented region. After a plurality of segmentations, the area of the segmented region is less than the preset minimum precision (the preset minimum precision is 25 pixels in the present disclosure), then the segmentation is stopped, and the corresponding region is output. After executing the quadtree algorithm, the segmented region of the image to be detected is the region of the image to be detected that has a difference relative to the template image and satisfies the preset minimum precision, i.e., the defect region. If there is no output, the image to be detected is free of defects.

The quadtree segmentation module refers to a sub-module of a detection module configured to perform recursive quadratic segmentation on the template image and the image to be detected using the quadtree algorithm. More descriptions regarding the detection module may be found later in the corresponding description.

In some embodiments, the method for detecting the surface defect based on the perceptual autoencoder further includes based on the processor, adjusting the preset similarity threshold through a threshold prediction model based on historical detection data, preset acquisition parameters, and arithmetic parameters of the processor every preset period or in response to the cumulative count of detections being greater than a preset detection threshold. Descriptions regarding the processor may be found in FIG. 7 and related descriptions thereof.

The preset period refers to a preset time to adjust the preset similarity threshold. The preset period may be preset based on experience.

The cumulative count of detections refers to a total count of detections made using the preset similarity threshold before the preset similarity threshold is adjusted using the threshold prediction model. It is important to note that after one adjustment using the threshold prediction model, the cumulative count of detections for the adjusted preset similarity threshold is normalized to 0.

The preset detection threshold refers to a preset critical value of the count of detections when it is needed to adjust the preset similarity threshold. The preset detection threshold may be preset based on experience.

In some embodiments, the preset detection threshold is related to the arithmetic parameters of the processor.

The arithmetic parameters of the processor include the memory size and the cache efficiency of the processor. The cache efficiency of the processor characterizes a speed of the processor processes data.

In some embodiments, the preset detection threshold is negatively correlated to the arithmetic parameters of the processor, i.e., the greater the cache efficiency of the processor, the smaller the preset detection threshold.

In some embodiments of the present disclosure, when the cache efficiency of the processor is larger, the processor processes the data faster. At this time, appropriately lowering the preset detection threshold may increase the count of times of using model to adjust the preset similarity threshold and improve the detection accuracy without excessively increasing the detection time.

The historical detection data includes feature information of the image to be detected and the corresponding count of segmentations and detection time, etc., during the last preset period or a plurality of previous detections.

The threshold prediction model refers to a model for determining the preset similarity threshold. In some embodiments, the threshold prediction model may be a machine learning model, for example, a neural network (NN) model, etc.

In some embodiments, inputs of the threshold prediction model include the historical detection data, preset acquisition parameters, and the arithmetic parameters of the processor, and outputs of the threshold prediction model include the preset similarity threshold.

The preset acquisition parameters refer to preset parameters related to the acquisition of the image to be detected. For example, the preset acquisition parameters include a count of acquired images and resolutions of the corresponding acquired images.

In some embodiments, the threshold prediction model may be obtained in a variety of ways. For example, the threshold prediction model is obtained by training based on a plurality of first training samples with a first label, etc. A set of first training samples includes sample detection data, sample acquisition parameters, and sample arithmetic parameters of the processor in a sample preset period, with the corresponding first label being a sample similarity threshold used in a next preset period of the sample preset period.

Merely by way of example, the control unit may count historical detection data, historical acquisition parameters, and historical arithmetic parameters of the processor within a historical preset period as the sample detection data, the sample acquisition parameters, and the sample arithmetic parameters of the processor, respectively, i.e., a set of first training samples. The control unit may also count a plurality of historical detections performed with the first training samples, determine a weighted sum of a count of defective regions actually generated by the image to be detected and an actual detection time in a subsequent preset period or a plurality of subsequent historical detections, and use the historical similarity threshold corresponding to the maximum weighted sum as the first label for the first training sample.

The count of defective regions actually generated and the actual detection time refer to a count of defective regions obtained and the time spent, respectively, when a current detection is completed. When determining the weighted sum of the count of defective regions actually generated and the actual detection time, weighting coefficients may be preset based on experience. The weighting coefficient for the count of defective regions actually generated is positive and the weighting coefficient for the actual detection time is negative.

In some embodiments, the control unit may input the first training sample into an initial threshold prediction model to obtain an output of the initial threshold prediction model; construct a loss function based on the output of the initial threshold prediction model and the first label; iteratively update, based on the loss function, parameters of the initial threshold prediction model; complete the training until an iteration end condition is satisfied and obtain a trained threshold prediction model. The iteration end condition includes the loss function converging or the count of iterations reaching a threshold, etc.

In some embodiments of the present disclosure, adjusting the preset similarity threshold every preset period or after a count of detections may both effectively control the detection time and ensure the detection accuracy. Utilizing the self-learning capability of the machine learning model, etc., may reduce the time to determine the preset similarity threshold, while ensuring the accuracy of the adjusted preset similarity threshold.

In some embodiments, the method for detecting the surface defect based on the perceptual autoencoder further includes based on the processor, reducing the preset minimum precision in response to a mean of structural similarities of a plurality of minimum segmented regions in the previous detection not satisfying a first preset condition.

The minimum segmented region is a segmented region whose area is smaller than the preset minimum precision. The plurality of minimum segmented regions refer to minimum segmented regions with a count not less than a preset count, which may be a value such as 2.

The first preset condition is a judgment condition that determines whether the preset minimum precision needs to be reduced. In some embodiments, the first preset condition is determined based on the preset similarity threshold. For example, the first preset condition may be that a difference between a mean of corresponding structural similarities of the plurality of minimum segmented regions and the preset similarity threshold is greater than the first preset threshold. The corresponding structural similarities of the minimum segmented regions are structural similarities between the minimum segmented regions and regions of the corresponding template image.

The first preset threshold is a preset critical value of the difference between the mean of the structural similarities of the plurality of minimum segmented regions and the preset similarity threshold. The first preset threshold may be predetermined based on experience.

In some embodiments, the first preset threshold is related to the size of each unit in the circuit of the component to be detected. Each unit in the circuit of the component to be detected includes a wire, a connecting wire, a connector, an electronic component, or the like.

In some embodiments, the first preset threshold is positively correlated to the size of each unit in the component circuit to be detected (e.g., the circuit to be detected), i.e., the smaller the size of each unit in the component circuit to be detected, the smaller the first preset threshold.

In some embodiments of the present disclosure, the smaller the size of each unit in the circuit of the component to be detected, the higher the precision within the component to be detected, the smaller the range of defects appearing. At this time, it is necessary to appropriately lower the first preset threshold to ensure that the defective region is accurately segmented.

In some embodiments, the control unit may adjust the preset minimum precision by a preset precision adjustment amount to reduce the preset minimum precision.

The preset precision adjustment amount refers to a preset amount of reducing the preset minimum precision, for example, reducing 2 pixels, etc. The preset accuracy adjustment amount may be preset based on experience.

In some embodiments of the present disclosure, considering that a plurality of inconspicuous defects may exist in the segmented region, a larger preset accuracy adjustment amount may result in smaller segmented regions and more segmentation times, which is favorable for the detection of defective regions.

In some embodiments of the present disclosure, by setting the preset similarity threshold and the preset minimum precision, it is possible to make the segmentation of the image to a certain range, avoid segmenting the image without limitation, and reduce the unnecessary waste of resources in the process of acquiring the defective regions. In some embodiments, see FIG. 5, the present disclosure utilizes a quadtree algorithm to perform a recursive quadratic segmentation on the template image and the image to be detected. The operations are as follows.

In S301, the template image and the image to be detected are segmented into four images, and a structural similarity between a region after segmentation and a corresponding location of a template image is determined. The region after segmentation is the segmented region.

In S302, a region with a structural similarity below the preset similarity threshold is selected, and then the recursive quadratic segmentation is performed on the region, recursively.

In S303, an area of the segmented region is compared with the preset minimum precision, if the area of the segmented region is greater than the preset minimum precision, operation S302 is performed; if the area of the segmented region is less than or equal to the preset minimum precision, operation S304 is performed.

In S304, segmentation is stopped and a structural similarity of the segmented region is compared with the preset similarity threshold; if the structural similarity of the segmented region is less than or equal to the preset similarity threshold, the segmented region is output as a defective region; if the structural similarity is greater than the preset similarity threshold, there is no output, indicating that there is no defect.

In other words, a region whose structural similarity is less than or equal to the preset similarity threshold is output as the defective region of the image to be detected. If there is no region whose structural similarity is less than or equal to the preset similarity threshold, the image to be detected is not defective.

In some embodiments of the present disclosure, images are not required to be strictly aligned when using the quadtree segmentation to compare image differences, and the preset minimum precision may be used to limit the size of the output region to ensure the accuracy of the obtained defective region.

In some embodiments of the present disclosure, by using perceptual loss instead of pixel-by-pixel loss, the problem of blurred single-pixel-loss output image with serious distortion at the edges is solved. The method is highly migratory, and it may migrate well to a new target to be detected. At the same time, by using the feature pyramid instead of the sliding window manner, the feature pyramid does not require a plurality of redundant computation by sliding on the original image, which effectively reduces the memory and computation cost.

Embodiment 2

This embodiment provides a system for detecting a surface defect of a circuit based on perception unsupervised (also referred to as a system for detecting a surface defect based on a perceptual autoencoder, and is simply referred to as the system hereinafter), including a construction module, a training module, and a detection module.

In some embodiments, the system further includes a control unit, and the control unit may be configured to execute the aforementioned method for detecting the surface defect based on the perceptual autoencoder. More descriptions regarding the control unit and the method for detecting the surface defect based on the perceptual autoencoder may be found in the corresponding descriptions of FIG. 1-FIG. 5.

The construction module is configured to construct an unsupervised perceptual autoencoder network with an encoder-decoder architecture, the encoder including a feature pyramid; designates a defect-free sample image as an input image and inputs into the encoder, which extracts features at different scales and then performs a convolution operation on the features to obtain a feature map, and the decoder outputs an initial reconstructed image by performing an inverse convolution on the feature map.

The training module is configured to input an initial reconstructed image and an original image into a perceptual computing network, the perceptual computing network determining feature maps of the two, respectively, determine a perceptual loss based on the feature maps of the two, optimize the perceptual autoencoder network based on the perceptual loss using a backpropagation algorithm, and complete training of the perceptual autoencoder network until the perceptual loss reaches a minimum value.

The detection module is configured to acquire an image to be detected of a circuit to be detected, input the image to be detected into a trained perceptual autoencoder network, and output a defect-free output image as a template image. Then, the detection module performs a recursive quadratic segmentation on the template image and the image to be detected using a quadtree algorithm and stop the recursive quadratic segmentation until an area of a segmented region that is lower than a preset similarity threshold is less than or equal to a preset minimum precision. At this time, if the structural similarity of the segmented region is less than or equal to the preset similarity threshold, the region is output as a defective region; and if the structural similarity of the segmented region is greater than the preset similarity threshold, then there is no output, indicating that there is no defect.

Figure 6:
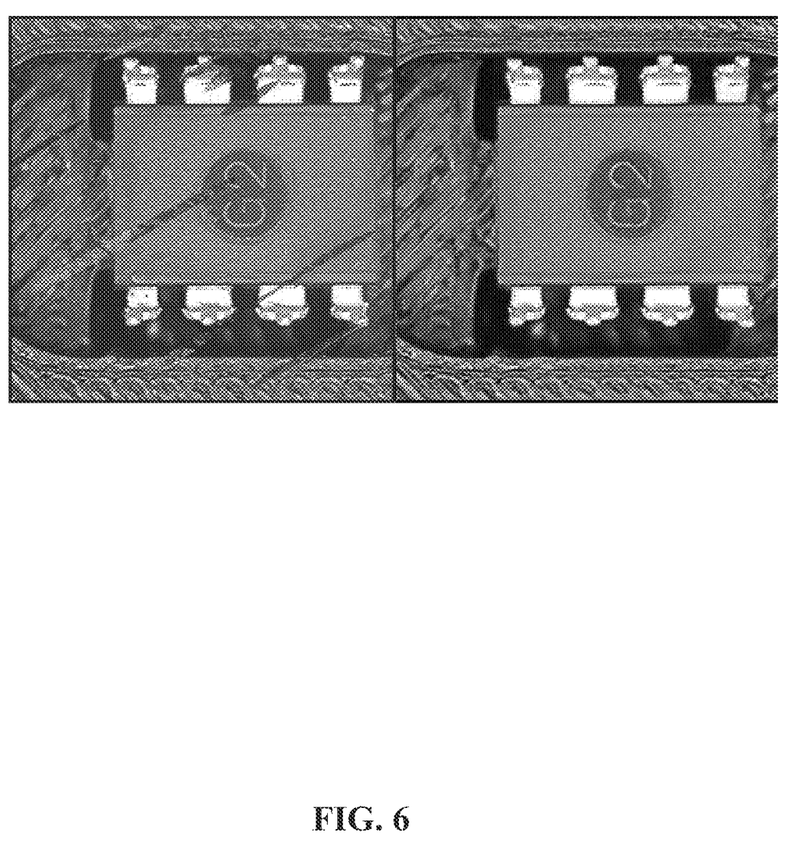
FIG. 6 is a schematic diagram illustrating an input and a generated template according to some embodiments of the present disclosure.

Referring to FIG. 6, the image on the left side is the input image to be detected, and the image on the right side is the template image generated by the trained perceptual autoencoder network based on the image to be detected.

In some embodiments, the present disclosure has been tested to achieve a detection accuracy of 78.03 for the front side and 76.34 for the back side and F1 scores of 86.66 for the front side and 86.58 for the back side on the dip-8 chip package surface dataset including 200 images.

Embodiment 3

Figure 7:
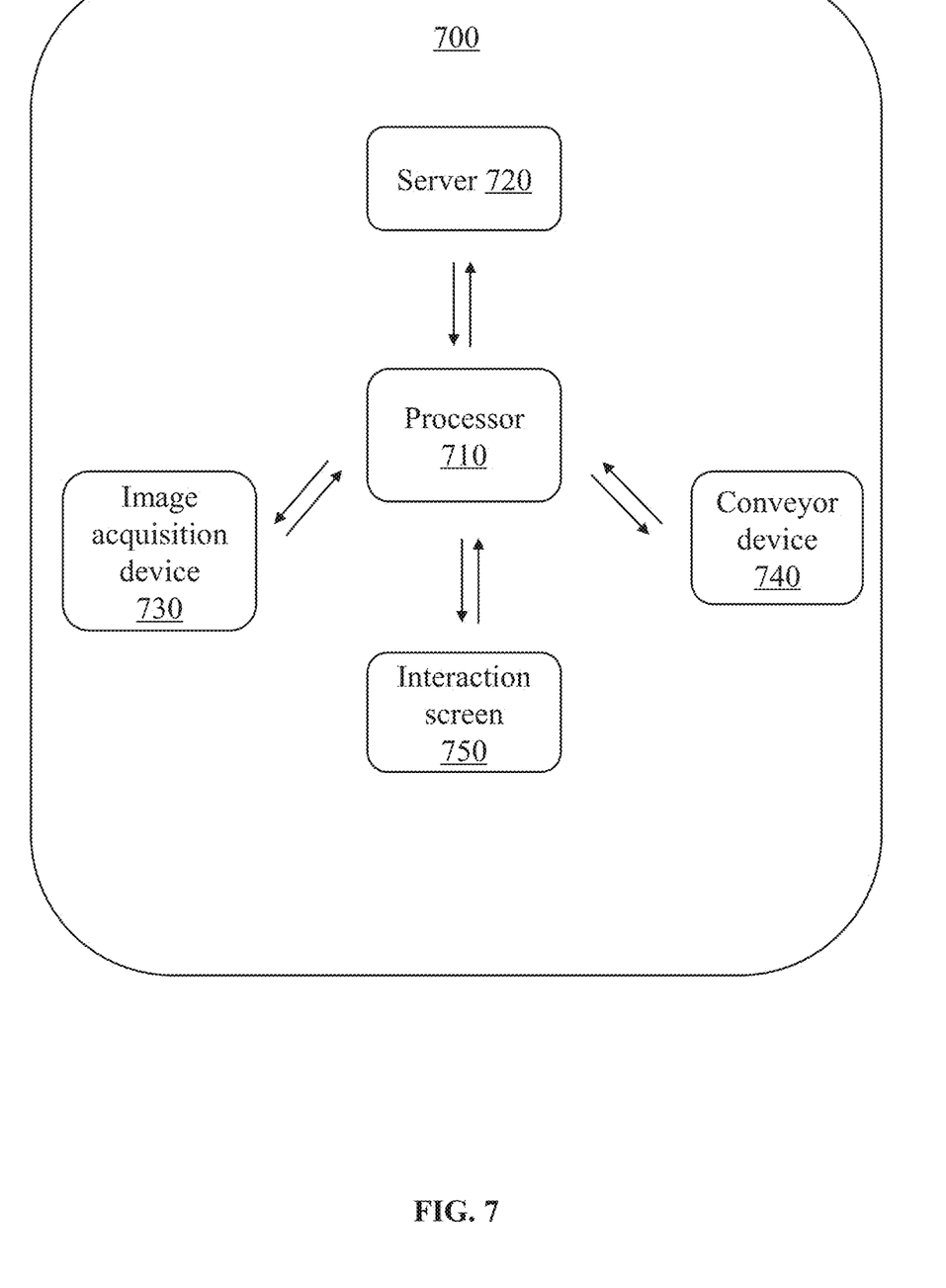
FIG. 7 is a schematic diagram illustrating a device for detecting a surface defect based on a perceptual autoencoder according to some embodiments of the present disclosure.

One of the embodiments of the present disclosure provides a device for detecting a surface defect based on a perceptual autoencoder. As shown in FIG. 7, in some embodiments, a device for detecting a surface defect based on a perceptual autoencoder 700 includes a processor 710, a server 720, an image acquisition device 730, a conveyor device 740, and an interaction screen 750. The processor is communicatively connected to the server, the image acquisition device, the conveyor device, and the interaction screen.

The image acquisition device is configured to acquire an image to be detected corresponding to a circuit of a component to be detected. The component to be detected is an object that needs image detection, and the component to be detected may be a different device or equipment depending on the application scenario. For example, the component to be detected may be a device or equipment to be detected, etc.

The image acquisition device 730 is a device that acquires images. In some embodiments, the image acquisition device 730 may include, but is not limited to, a device such as a camera (e.g., a digital camera, an analog camera, s CCD camera, etc.), a red, green, and blue (RGB) sensor, and/or a RGB depth (RGB-D) sensor.

The conveyor device is configured to transport the components to be detected, for example, the conveyor device may be a device such as a conveyor belt.

The server is configured to construct an unsupervised perceptual autoencoder network with an encoder-decoder architecture, with the encoder including a feature pyramid; input a defect-free sample image into the encoder, which extracts features at different scales from the input image, and then performs an inverse convolution on the sample image to output an initial reconstructed image; input the initial reconstructed image and an original image into a perceptual computing network, which determines the feature maps of the two images, determine the perceptual loss based on the feature maps of the two images, optimize the perceptual autoencoder network based on the perceptual loss and the backpropagation algorithm until the perceptual loss reaches a preset loss threshold, and complete the training of the perceptual autoencoder network and store the trained perceptual autoencoder network.

The preset loss threshold refers to a preset maximum perceptual loss that is acceptable. In some embodiments, the preset loss threshold may be manually determined empirically in advance.

In some embodiments, the server 720 may be configured to manage resources and process data and/or information from at least one component of the device or an external data source (e.g., a cloud data center). In some embodiments, the server 720 may be a single server or a group of servers. The group of servers may be centralized or distributed (e.g., the server 720 may be a distributed system), and may be dedicated or served simultaneously by other devices or systems. In some embodiments, the server 720 may be regional or remote. In some embodiments, the server 720 may be implemented on a cloud platform or provided virtually. Merely by way of example, a cloud platform may include a private cloud, a public cloud, a hybrid cloud, a community cloud, a distributed cloud, an on-premises cloud, a multi-tier cloud, etc., or any combination thereof.

The processor is configured to control the conveyor device to transport the component to be detected with preset conveyance parameters; control the image acquisition device to acquire the image to be detected of the component to be detected with preset acquisition parameters; input the image to be detected into the trained perceptual autoencoder network obtained from the server, and output a defect-free output image as a template image. The processor is further configured to perform a recursive quadratic segmentation on the template image and the image to be detected using the quadtree algorithm and then stop the recursive quadratic segmentation until an area of a segmented region that is lower than a preset similarity threshold is less than or equal to a preset minimum precision. At this time, if the structural similarity of the region is less than or equal to the preset similarity threshold, the region is designated as a defective region, and the defective region is output to the interaction screen; if the structural similarity of the region is greater than the preset similarity threshold, there is no output, indicating that there is no defect.

The preset conveyance parameters are preset parameters related to the conveyor device. For example, the preset conveyance parameters may include, but are not limited to, a start/stop time of the conveyor device, etc. In some embodiments, the processor may control the conveyor device to transport the component to be detected with the preset conveyance parameters. For example, in response to the interaction screen outputting all defective regions of the current component to be detected, then the processor may turn on the conveyor belt and transport a next component to be detected underneath the image acquisition device.

The processor 710 may process data and/or information obtained from other device components. In some embodiments, the processor may be a central processing unit (CPU), a graphics processor (GPU), an application-specific integrated circuit (ASIC), etc. or any combination thereof. In some embodiments, the processor may obtain the trained perceptual autoencoder network from the server to detect the image to be detected, thereby determining whether defects exist in the image to be detected.

The interaction screen 750 refers to a screen for human-computer interaction. In some embodiments, the interaction screen 750 may include a computer screen, a touch screen, etc., or any combination thereof.

More descriptions regarding the functions of the server and the processor may be found in corresponding descriptions in FIGS. 1-5.

In some embodiments, the processor is further configured to send a type change instruction to the server in response to a change in the type of the component to be detected.

The type of the component to be detected may be differentiated according to different categorization manners. For example, all components to be detected may be clustered based on a size of the component to be detected, a count of internal circuits, and a count of outer contour edges, and a plurality of cluster clusters obtained after clustering may be designated as a plurality of types of all the components to be detected. The type of the component to be detected is changed, that is, the current component to be detected does not belong to the same type as the previous component to be detected, such as not belonging to the same cluster.

The type change instruction refers to an instruction indicating that the type of the component to be detected is changed.

In some embodiments, in response to the change in the type of the component to be detected, the processor may send the type change instruction to the server.

In some embodiments, the server is further configured to adjust the preset loss threshold in response to receiving the type change instruction.

In some embodiments, the preset loss threshold includes a first preset loss threshold and a second preset loss threshold. The first preset loss threshold is greater than the second preset loss threshold. In response to the change in the type of the component to be detected, the server may use the second preset loss threshold as a threshold of the perceptual loss to reduce the time for training the model and improve efficiency. In response to the type of the component to be detected remaining the same, the server may use the first preset loss threshold as the threshold of the perceptual loss.

In some embodiments of the present disclosure, the server may dynamically adjust the preset loss threshold, which helps to ensure the accuracy of the model training without incurring additional time costs.

In some embodiments, the processor is further configured to adjust, in response to completing the detection, the preset acquisition parameters based on the structural similarity of each defective region and the structural similarity of each minimum defect-free region; send the adjusted preset acquisition parameters to the image acquisition device, and control the image acquisition device to reacquire a plurality of images to be detected for re-detection.

The minimum defect-free region refers to a segmented region whose structural similarity is greater than the preset similarity threshold and whose area is less than or equal to the preset minimum precision.

In some embodiments, the processor may adjust the preset acquisition parameters in a variety of ways based on the structural similarity of each defective region and the structural similarity of each minimum defect-free region. For example, the processor may determine a mean of the structural similarity of each defective region as a first mean, determine a mean of the structural similarity of each minimum defect-free region as a second mean, and determine a difference between the second mean and the first mean. If the difference is less than a preset difference threshold, the count of acquired images and the corresponding resolution may be increased by a preset adjustment amount, respectively.

The preset difference threshold refers to a difference between the second mean and the first mean. The preset adjustment amount refers to a critical value of an adjustment amount for adjusting the preset acquisition parameters. The preset difference threshold and the preset adjustment amount may be preset based on experience.

In some embodiments, the preset difference threshold may also be related to the count of internal circuits of the component to be detected (e.g., the circuit to be detected). For example, the preset difference threshold may be positively correlated to the count of internal circuits of the component to be detected.

In some embodiments of the present disclosure, taking into account that part of the segmented regions may have the hidden danger of inconspicuous, potential defects, resulting in the structural similarity of the part of segmented region being higher than the similarity threshold but the difference in structural similarity with the defective region is actually not large, by adjusting the preset acquisition parameters, the image acquisition device may be controlled to reacquire the image at a higher resolution, ensuring the detection accuracy. At the same time, when adjusting the preset acquisition parameters, the count of internal circuits of the component to be detected is also taken into account, the influence of the internal circuits on the defects is fully considered, and the acquisition of the image of a higher resolution for such a component to be detected may improve the detection accuracy.

In some embodiments, the server is further configured to determine a feature extraction parameter of each input image based on the feature information of each input image, the feature extraction parameter including a plurality of scales when extracting the feature of the input image.

The feature information refers to information that describes the feature of the sample component in the input image. In some embodiments, the feature information may include a size of a sample component in the input image, a count of internal circuits of the sample component, and/or a count of outer contour edges of the sample component, etc. The sample component refers to a component that is captured as a sample for the input image, such as a component to be detected that needs to be tested for the presence of defects.

The feature extraction parameter refers to a parameter for extracting the feature information of the input image. For example, the feature extraction parameter includes scale information when the input image is subjected to feature extraction. Descriptions regarding the scale may be found in FIG. 2 and related descriptions thereof.

In some embodiments, the server may determine the feature extraction parameter of each input image based on the feature information of each input image. For example, for each input image, the server may obtain, via a first vector database, its corresponding feature extraction parameter, which helps to ensure the accuracy of the feature extraction parameter of the input image, and thus ensures the obtained reliability of the features of the input image.

The first vector database includes a plurality of first reference feature vectors and labels corresponding to the plurality of first reference feature vectors, respectively. The plurality of first reference feature vectors may be constructed based on historical data, and the historical data may include historical feature information of a plurality of different historical input images. The labels may be preferred feature extraction parameters of historical input images corresponding to the first reference feature vectors. For example, the server may perform a plurality of detections on the historical input image corresponding to each of the first reference feature vectors in the first vector database and correspondingly obtain a plurality of output template images. The server may construct the feature extraction parameter corresponding to one of the template images with the best quality as a label corresponding to that first reference feature vector. The template image with the best quality may be a template image with the least count of defects manually detected by the technician.

The server may construct a target vector from feature information of the current input image. The server may select the label corresponding to the first reference feature vector in the first vector database that has the highest vectorial similarity to the target vector as the feature extraction parameter corresponding to the target vector. The vector similarity may be negatively correlated to a vector distance such as a cosine distance.

Some embodiments of the present disclosure provide a device for detecting a surface defect based on a perceptual autoencoder, which facilitates the implementation of the method for detecting the surface defect based on the perceptual autoencoder through the interactive collaboration, coordination, and regular operation of the components.

One of the embodiments of the present disclosure provides a computer device including a memory, a processor, and a computer program stored in the memory and runnable on the processor. The processor executes the computer program to implement the method for detecting the surface defect based on the perceptual autoencoder of the present disclosure.

One of the embodiments of the present disclosure provides a non-transitory computer-readable storage medium storing computer instructions. When a computer reads the computer instructions in the storage medium, the computer performs the method for detecting the surface defect based on the perceptual autoencoder of the present disclosure.

What is claimed is:

1. A method for detecting a surface defect based on a perceptual autoencoder, comprising:

operation (1): constructing an unsupervised perceptual autoencoder network with an encoder-decoder architecture, wherein the encoder includes a feature pyramid; and inputting a defect-free sample image to the encoder, wherein the encoder extracts features at different scales from the sample image and then performs a convolution on the features to obtain a feature map, and the decoder outputs an initial reconstructed image by performing an inverse convolution on the feature map;

operation (2): inputting the initial reconstructed image and an original image into a perceptual computing network, wherein the perceptual computing network determines a feature map of the initial reconstructed image and a feature map of the original image, determining a perceptual loss based on the feature map of the initial reconstructed image and the feature map of the original image, optimizing the perceptual autoencoder network based on the perceptual loss using a backpropagation algorithm, and completing training of the perceptual autoencoder network until the perceptual loss reaches a minimum value;

operation (3): acquiring an image to be detected of a circuit to be detected, inputting the image to be detected into a trained perceptual autoencoder network, and outputting a defect-free output image as a template image; and performing a recursive quadratic segmentation on the template image and the image to be detected using a quadtree algorithm and stopping the recursive quadratic segmentation until an area of a segmented region that is lower than a preset similarity threshold is less than or equal to a preset minimum precision, wherein:

in response to determining that a structural similarity of a region is less than or equal to the preset similarity threshold, the region is output as a defective region; or in response to determining that the structural similarity of the region is greater than the preset similarity threshold, there is no output, indicating no defect.

2. The method of claim 1, wherein in operation (1), the sample image is a grayscale image or a color image of a circuit.

3. The method of claim 1, wherein in operation (2), the perceptual loss is a mean square error between the feature map of the initial reconstructed image and the feature map of the original image.

4. The method of claim 3, wherein in operation (2), a functional equation for the perceptual loss is:

$$\text{Loss}_{per} = \Sigma_{k=1}^{n} f(\rho(X_k), \rho(\alpha(X)_k)), \text{ wherein}$$

$\text{Loss}_{per}$ denotes the perceptual loss, $\rho$ denotes the perceptual computing network, X denotes the input image containing n components after vectorization, $\alpha$ denotes an autoencoder operation, $X_k$ denotes a kth component of X, $\alpha(X)$ denotes a reconstructed template output by the perceptual autoencoder network, $\alpha(X)_k$ denotes a kth component after vectorization of the reconstructed template, $\rho(X_k)$ and $\rho(\alpha(X)_k)$ denote feature vectors of the input image and the reconstructed template extracted using a perceptual network.

5. The method of claim 1, wherein in operation (3), the preset similarity threshold is 0.2; and the preset minimum precision is 25 pixels.

6. The method of claim 1, wherein in operation (3), the performing a recursive quadratic segmentation on the template image and the image to be detected using a quadtree algorithm includes:
  operation (301): segmenting the template image and the image to be detected into four images, and determining a structural similarity between a region after segmentation and a corresponding location of the template image;
  operation (302): selecting a region with a structural similarity below the preset similarity threshold, then performing the recursive quadratic segmentation on the region, recursively;
  operation (303): comparing the area of the segmented region with the preset minimum precision,
    in response to determining that the area of the segmented region is greater than the preset minimum precision, performing operation (302); or
    in response to determining that the area of the segmented region is less than the preset minimum precision, performing operation (304); and
  operation (304): stopping segmentation and comparing a structural similarity of the segmented region with the preset similarity threshold;
    in response to determining that the structural similarity of the segmented region is less than or equal to the preset similarity threshold, outputting the segmented region as the defective region; or
    in response to determining that the structural similarity of the segmented region is greater than the preset similarity threshold, no output, indicating no defect.

7. A non-transitory computer-readable storage medium storing computer instructions, wherein when a computer reads the computer instructions in the storage medium, the computer performs the method of claim 1.

8. A system for detecting a surface defect based on a perceptual autoencoder, comprising a construction module, a training module, and a detection module, wherein
  the construction module is configured to construct an unsupervised perceptual autoencoder network with an encoder-decoder architecture, wherein the encoder includes a feature pyramid; and
    input a defect-free sample image to the encoder, wherein the encoder extracts features at different scales from the sample image and then performs a convolution on the features to obtain a feature map, and the decoder outputs an initial reconstructed image by performing an inverse convolution on the feature map;
  the training module is configured to input the initial reconstructed image and an original image into a perceptual computing network, wherein the perceptual computing network determines a feature map of the initial reconstructed image and a feature map of the original image, determine a perceptual loss based on the feature map of the initial reconstructed image and the feature map of the original image, optimize the perceptual autoencoder network based on the perceptual loss using a backpropagation algorithm, and complete training of the perceptual autoencoder network until the perceptual loss reaches a minimum value; and
  the detection module is configured to acquire an image to be detected of a circuit to be detected, input the image to be detected into a trained perceptual autoencoder network, and output a defect-free output image as a template image; and
    perform a recursive quadratic segmentation on the template image and the image to be detected using a quadtree algorithm and stop the recursive quadratic segmentation until an area of a segmented region that is lower than a preset similarity threshold is less than or equal to a preset minimum precision, wherein:
      in response to determining that a structural similarity of a region is less than or equal to the preset similarity threshold, the region is output as a defective region; or
      in response to determining that the structural similarity of the region is greater than the preset similarity threshold, there is no output, indicating no defect.

* * * * *